United States Patent [19]

Beaulieu

[11] 4,143,337

[45] Mar. 6, 1979

[54] METHOD OF PUMPING

[75] Inventor: Jacques Beaulieu, St. Foy, Canada

[73] Assignee: Her Majesty the Queen in right of Canada, as represented by the Minister of National Defence, Ottawa, Canada

[21] Appl. No.: 158,209

[22] Filed: Jun. 30, 1971

Related U.S. Application Data

[63] Continuation-in-part of Ser. No. 731,693, May 21, 1968, abandoned.

[30] Foreign Application Priority Data

Apr. 19, 1968 [CA] Canada............................ 017844

[51] Int. Cl.² ............................................. H01S 3/097
[52] U.S. Cl. ............................................. 331/94.5 PE

[58] Field of Search ..................... 331/94.5 G, 94.5 P, 331/94.5 PE, 94.5 D; 330/4.3

[56] References Cited

U.S. PATENT DOCUMENTS

| 3,393,372 | 7/1968 | Vickery et al. | 331/94.5 G |
| 3,464,028 | 8/1969 | Mueller | 331/94.5 G |

Primary Examiner—William L. Sikes
Attorney, Agent, or Firm—Cushman, Darby & Cushman

[57] ABSTRACT

A $CO_2$ gas laser is disclosed which is capable of operation at or above atmospheric pressure and requires no windows or evacuation system. Substantial increases in power output, simplicity and cheapness are achieved.

11 Claims, 8 Drawing Figures

METHOD OF PUMPING

This application is a continuation-in-part of my prior application Ser. No. 731,693 filed May 21, 1968, now abandoned.

The present invention relates to the production of coherent electromagnetic energy, and in particular the present invention provides a novel form of laser excitation.

In accordance with this invention it is possible to operate a gas laser at atmospheric pressure while dispensing with windows and vacuum pumping equipment.

The present invention also provides novel methods for the operation of laser apparatus to achieve previously unobtainable power output and efficiency.

It is an object of the present invention to achieve laser action in a gas laser by directly exciting the laser gas through collisions with electrons whose kinetic energy is nearly equal to the energy of the desired excited state.

It is a further object to operate a gas laser at relatively high pressures such as, for example atmospheric pressure, in order to increase power output per unit volume with simplified and relatively inexpensive structures.

It is a further object of the invention to achieve laser action in a $CO_2$ molecular laser by using a transverse electrical discharge to give direct excitation of the $CO_2$ and a substantial improvement in laser power and excitation rate.

It is a further object of the invention to provide a high pressure $CO_2$ laser with a multiple discharge transverse excitation system using a plurality of equalized electric discharges. Such an equalization system may be obtained by providing a number of electrodes within the laser structure as detailed hereinafter and pulsing these electrodes by separate pulsers controlled by a synchronizing pulser or by pulsing the electrodes with a single high power pulser. Preferably, the apparatus of the invention includes suitable impedances such as resistors, inductors, or inductors mounted on a common core, to achieve equalization of the discharges.

It is a further object of the present invention to provide a laser system having a large volume excited by the transverse discharge excitation system, the electrodes providing the excitation consisting of an elongated central electrode, and a plurality of outer electrodes arranged about the central electrode.

It is also an object of the present invention to provide a laser system in which carbon dioxide is mixed with a proportion of helium to reduce the electrical discharge initiation voltage and provide an abundant source of electrons which permits the use of smaller electrode impedances while maintaining uniform discharges. Furthermore as in previous low pressure lasers, Helium assists in lowering the rotational temperatures of the $CO_2$ and in preferentially depopulating the lower laser level.

A further feature of the present invention provides for the use of nitrogen in the gas mixture which acts as a reservoir at the upper energy level of $CO_2$ and increases the effective lifetime of these energy levels.

It is also an object of the present invention to energize an atmospheric pressure carbon dioxide gas laser with a transverse electrical discharge having a controlled discharge in which the pulse duration is insufficient to permit the establishment of bright arc discharges.

It is a further object of the invention to impart direct pumping of carbon dioxide molecules by electrons at an average electron energy level of between about 0.2 and 4.0 electron volts, preferably between 1.0 and 2.0 electron volts.

Further it is an object of the invention to utilize a Helium, Carbon dioxide and nitrogen gas mixture in the proportions of from 0 to 99% Helium
1 to 90% Carbon dioxide, and
0 to 75% Nitrogen

DESCRIPTION OF PRIOR ART

Numerous devices have been developed to generate coherent radiant energy. When used for the generation or amplification of microwave energy these devices have been termed masers, (an acronym for Microwave Amplification by the Stimulated Emission of Radiation), when used for the generation or amplification of radiant energy in the visible or infrared spectrum have been termed lasers. The present invention is concerned with devices referred to as gas lasers and includes such devices used for generating or amplifying coherent radiation in the infrared portions of the spectrum.

The molecules of gas used in a gas laser may have several energy states. For laser action to occur, a population inversion between a metastable excited state and a lower state is required, and the metastable state must be radiatively coupled to the lower energy state. Techniques for obtaining a population inversion are referred to as "pumping." The photon radiation emitted by the particles when returning to the lower state from the metastable state is stimulated by incident photons and this radiation is coherent with the incident photons.

According to known techniques, molecules of the laser gas may be "pumped" or raised to the desired metastable state by various methods such as, for example, positive column or plasma discharge, thermal pumping, light pumping and RF excitation. The nitrogen ion laser is a specific form of thermally pumped laser in which a transverse electric discharge is used to heat the nitrogen until it is ionized and highly excited. This condition does lead to a short lived population inversion after the excitation has stopped due to different depopulation rates of the energy levels and gives an output pulse having a duration of 10 to 20 nanoseconds. Another known technique for pumping a gas laser has consisted in ionizing a first gas, such as helium, for example in a high temperature arc chamber, and then introducing this first gas into a lasing chamber together with a laser gas such as Neon, where an energy conversion occurs by resonant transfer between the first gas and the laser gas to pump the laser gas into the desired metastable state.

For the $CO_2$ laser as for many others the most common method of pumping is with a positive column discharge in which an electro-static charge is built up on the inside of an evacuated insulating tube, which charge tends to confine a low pressure plasma column and maintains it centrally within the cylindrical tube. With this apparatus departure from the cylindrical shape results in instability in the plasma. Additionally the positive column discharge type of $CO_2$ gas laser requires a substantial quantity of an intermediary gas such as nitrogen to be used in the gas mixture. The nitrogen interacts by collision with high velocity electrons in the plasma and the nitrogen then transfers its energy to the $CO_2$ molecules, thus pumping the $CO_2$.

Furthermore, positive column gas lasers operate at pressures substantially below atmospheric, for example 1/100th of an atmosphere. In certain cases, particularly with $CO_2$, gas decomposition resulting from the positive column discharge necessitates continuous replenishment of the gas to maintain efficient operation of the laser. Vacuum pumping systems are thus used to remove gases from the laser during operation. The replenishment of $CO_2$ requires a substantial vacuum pump to evacuate gases in the laser as the apparatus operates.

With known $CO_2$ gas lasers average power outputs up to approximately 100 watts have been obtained in lasers of one meter in length. The power output is at least partially proportional to the length of the tube and is independent of the diameter of the tube, with output per unit length decreasing slightly as the length of the tube increases. In pulse operation, known $CO_2$ gas lasers have been capable of producing peak power outputs of from two to five hundred watts per meter, see for example Physics Letters Vol. 20 No. 4 p 384 1 Mar/66. In the Q-switch mode of operation which is a technique known to those skilled in the laser art, see for example IEEE Journal of Quantum Electronics Vol. $QE_2$ No. 11 P 737 Nov. 1966, peak power outputs of approximately fifty kilowatts per meter have been reported.

In regard to the efficiency of known gas lasers, figures as high as 20% have been reported. These figures for efficiency however have been based only on the electrical energy consumed in the plasma discharge in comparison to the laser energy output. More meaningful efficiency figures can be obtained by considering the overall energy input to the gas laser system when compared to the laser energy output. With a typical continuous 500 watt plasma discharge gas laser of known type, the electrical energy consumed by the plasma is approximately 3000 watts. In addition, approximately 1000 watts is consumed in stabilization, and up to 4000 watts in vacuum pumping. Thus the total overall efficiency of such a known gas laser, when all energy inputs to the system are included, is of the order of seven per cent.

The structures of two known gas laser systems are shown for example in U.S. Pat. No. 3,302,127 granted Jan. 21, 1967 to Shao-chi Lin and in U.S. Pat. No. 3,172,057 granted Mar. 2, 1965 to W. R. Bennett Jr. In addition the structure of the positive column discharge laser is shown for example in High Power Gas Laser Research by F. Harrigan No. AD 637,023 available from the Clearing House for Federal Scientific and Technical Information of the United States Government and in High Power Gas Laser Research by David R. Whitehouse No. AD 637,031 available from the same source. All known gas laser structures are sealed enclosures requiring expensive vacuum seals and vacuum windows, and include vacuum pumping apparatus to provide high flow rates of gas in a low pressure vessel and hence are extremely large for moderate power outputs. The size and weight of such gas lasers is very great when compared with their power output. A typically known $CO_2$ gas laser system having a continuous power output of the order of 500 watts would have an overall length of approximately 25 ft and would weigh at least one ton.

In Bridges et al U.S. Pat. No. 3,577,096, May 4, 1971, there is disclosed a low pressure transverse discharge gas laser in which laser action is obtained from a gaseous mixture of $CO_2$, He and $N_2$ by excitation of the laser with an electric discharge transverse to the folded optical axis of the resonant cavity. Bridges et al does not teach the use of atmospheric pressures and pulse operation, nor does he refer to the kind of electrical discharge utilized. Accordingly it is clear that the Bridge et al invention is intended for use at the conventional low pressures.

STATEMENT OF INVENTION

The present invention pumps a $CO_2$ laser gas at or above atmospheric pressure by collision of the laser gas molecules with electrons having an average kinetic energy approximately equal to a predetermined upper energy state of the laser gas to create a population inversion. I have discovered that by pumping the $CO_2$ laser with short pulses of high voltage applied to a transverse electrode structure that operation at or above atmospheric pressure can be achieved. These short pulses may be obtained for example from the discharge of a capacitor charged to a high voltage. It is essential that the pulse length be less than the time required for the establishment of a bright arc discharge. What this time is will depend on a number of factors including the composition of the gas mixture, the configuration of the electrode structure, the capacitance of the discharge capacitor, as well as the voltage of the power supply.

The laser gas for use with the present invention is carbon dioxide, which is energized by a system of transverse electric discharges established in a mixture of carbon dioxide, helium and nitrogen to provide for the direct pumping of carbon dioxide by electrons having an average kinetic energy of not less than 0.2 electron volts and not more than 4.0 electron volts preferably about 1–2 electron volts.

One preferred technique for developing the very high concentration of lower energy electrons is an electric discharge. Such a discharge is completely independent of wall effects and therefore any shape of container can be used. In order to pump a large number of molecules a plurality of independent discharges, or a large continuous area discharge is required. A series of discharges may simultaneously be established from a plurality of electrodes to a single extended electrode of opposite polarity and the current in the discharge is maintained at a value to provide an electron flux which has an average kinetic energy approximately equal to a predetermined upper energy level of the laser gas. This electric discharge in the laser gas may be facilitated by mixing a quantity of an easily ionized gas, such as, for example, helium, with the laser gas.

The power output of a gas laser of the present invention is dependent upon the number of laser gas molecules which can be "pumped." The more gas molecules which can be pumped in a given volume of laser tube, the higher the power output from that volume will be. By increasing the gas pressure, the number of gas molecules per unit volume increases proportionally. Furthermore, the number of photons that can be emitted per molecule per unit time is dependent on the rate of depopulation or lifetime of the lower energy state. Thus the higher the pressure the shorter the lifetime becomes and the higher the number of photons which can be emitted per molecule per unit time. Hence the power output in a single short pulse would increase proportionally to pressure and the average power output of the laser when pulsed increases as the square of the pressure. To achieve this the laser gas must be pumped at a higher rate than possible with known techniques. The pumping method must also be capable of operation at high pressures. These requirements are met by the electric discharge pumping method of the invention.

In accordance with the present invention and in complete contrast to all prior gas laser tubes the present invention has been shown to operate at pressures as high as or even above atmospheric pressure. The pulsed electric discharge excitation techniques being independent of effects due to the wall of the container in which the electrode structure is housed provides complete freedom in the choice of container geometry, thus enabling optimization of the shape of the container, and complete freedom in the choice of materials from which the container may be constructed and in the techniques of assembling the container. The container need not be closed if the pressure is at or above atmospheric. One way in which uniform volume excitation can be achieved is by using an elongated central electrode and a number of peripheral electrodes discharging to the central electrode and providing discharge equalization means to ensure that each discharge delivers the same current as all other discharges. Current control means are also required to control the amount of current fed to each discharge so that the optimum electron flux at the resonant collision energy may be fed to the molecules of laser gas.

In accordance with a further feature of the invention a minor quantity of a gas such as nitrogen may be added to the mixture of readily ionizable gas and laser gas to serve as an energy reservoir so that additional energy from the discharge may be transferred to the laser gas.

The technique known as Q-switching may also be used to provide giant pulse laser action.

Some of the numerous advantages of the present invention should immediately be apparent. The laser operates at or near atmospheric pressure thus no vacuum seal structure is required. By doing away with the vacuum type structure, the vacuum pump and associated plumbing can also be dispensed with.

Additionally at high power levels it is no longer necessary to provide windows through which the laser energy may be removed from the laser tube since the gases from within the laser may be permitted to escape at atmospheric pressure. This removes the most serious limitation to achieving high power output from a gas laser. It will also be appreciated that a very simple non-critical laser construction is obtained. In essence all that is required is an electrode system to provide a plurality of controlled discharges, an optical resonator for focussing the laser energy through the active volume of the gas and a pulsed high voltage supply. Fundamentally, no containment vessel is required provided the electrode structure is maintained in a blanket of laser gas mixture. In many cases some form of containment vessel could be used. For applications where high power is not required, the present invention offers the advantages of reduced size, cost, and complexity over previous systems.

DETAILED DESCRIPTION OF EMBODIMENTS

Figure 1:
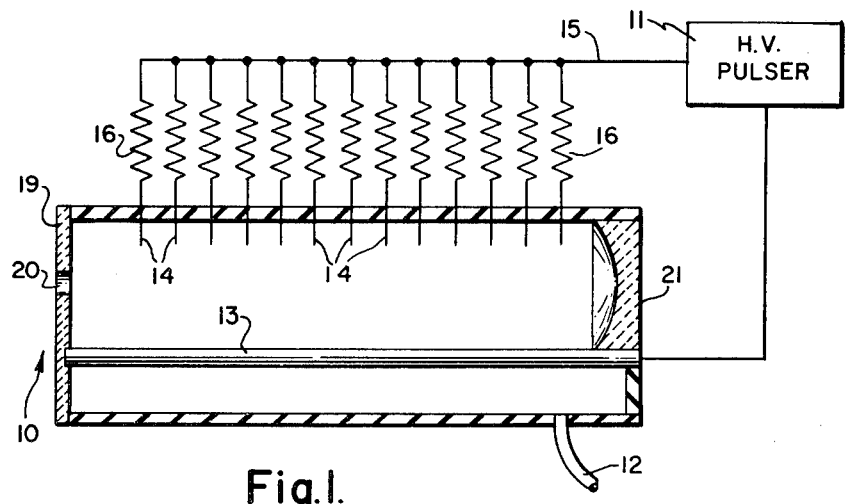
Figure 2:
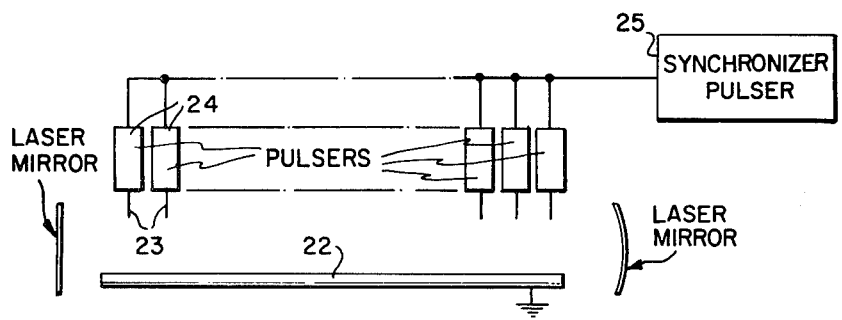
Figure 3:
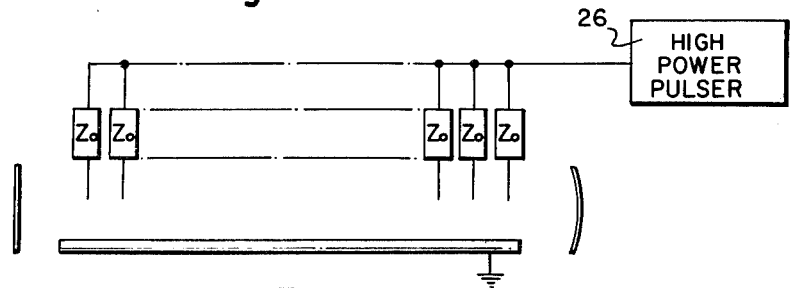
Figure 4:
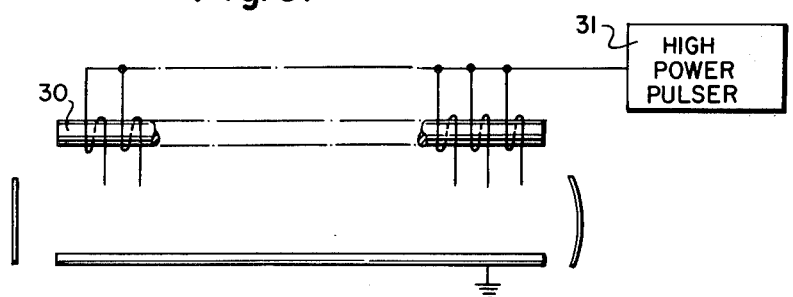
Figure 5:
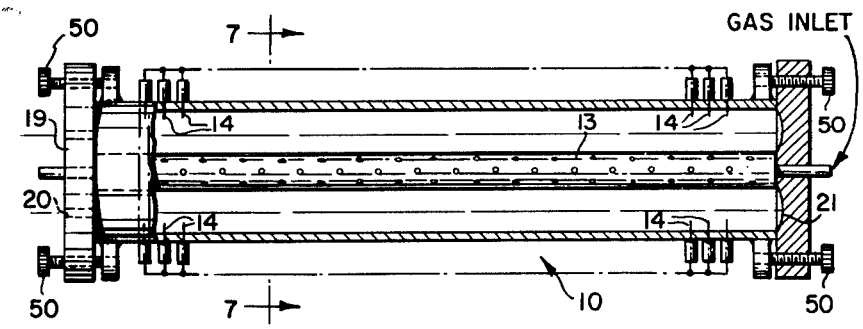
Figure 6:
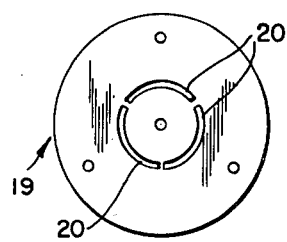
Figure 7:
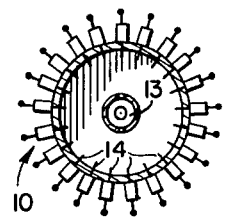
Figure 8:
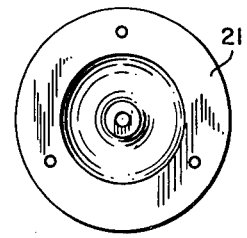

The accompanying drawings illustrate the principles and an embodiment of the present invention in which:

FIG. 1 is a section through the longitudinal axis of a laser apparatus in accordance with the invention, FIG. 2 is a schematic representation of one form of pulsing mechanism, FIG. 3 is a schematic representation of a second form of pulsing mechanism, FIG. 4 is a schematic representation of a third form of pulser, FIG. 5 is a longitudinal section through one embodiment of laser apparatus in accordance with the invention, FIG. 6 is an elevation of the apertured mirror used in FIG. 5, FIG. 7 is a cross section on the line 7—7 of FIG. 5, and FIG. 8 is an elevation of the curved mirror of FIG. 5.

Referring to FIG. 1 there is shown a laser apparatus constructed in accordance with the prevent invention including a lasing chamber 10, a high voltage pulser 11 and a gas inlet 12. The lasing chamber 10 is provided with an elongated electrode 13 connected to one terminal of the high voltage pulser 11, and a series of electrodes 14, spaced along the length of the chamber 10. The electrodes 14 are connected to the other terminal of the high voltage pulser 11 via bus 15 and resistors 16. A gas mixture including carbon dioxide is supplied at the inlet 12 to the lasing chamber 10. The chamber 10 is provided with a mirror 19 in which a slot 20 is formed. The rear wall 21 of the lasing chamber 10 is formed as a curved mirror for purposes well known to those skilled in the field of laser construction, thus forming with the mirror 19 an optical resonator.

The operation of the apparatus illustrated in FIG. 1 is as follows. Gas from the inlet 12 is admitted to the lasing chamber 10 at substantially atmospheric pressure. Some of the gas admitted to the chamber 10 will escape via the slot 20, however, since this gas is at atmospheric pressure, the amount of gas escaping through the opening 20 will be small. With the chamber 10 filled with gas, high voltage pulses from the high voltage pulser 11 are fed to the electrode system consisting of an electrode 13 and the electrodes 14. The pulse length is less than the time required to initiate bright arc discharges. Simultaneous electric discharges are initiated between each of the electrodes 14 and the electrode 13, the discharges being regulated by the resistors 16 connected in series with each of the electrodes 14. The electric shower discharges excite or "pump" the laser gas in the lasing chamber 10 giving rise to the radiation of coherent light, which is reinforced by the optical resonator and is emitted through the opening 20 as a coherent beam of electromagnetic radiation.

The comparatively simple structure shown in FIG. 1 has been constructed using readily available workshop materials with no special provision for sealing the joints between the mirror 21 and the walls of the chamber. One such structure had 45 pin electrodes 14 spaced 1 inch apart, and comprising one lead of a 1000 Ω resistor. The laser gas used was carbon dioxide mixed with helium as well as nitrogen. The high voltage pulser 11 was formed from a capacitor having a capacitance of 20 nanofarads and a spark gap, the capacitor being charged by a high voltage D.C. source of approximately 30 KV. The output from this experimental equipment was laser pulses of the order of 0.5 microsecond duration with powers in excess of 100 kilowatts. The overall efficiency of the experimental apparatus was greater than 1%.

As previously mentioned bright arc discharge in the laser medium must be avoided. These bright arcs cause a concentration of the input energy and thus prevent excitation throughout the active volume of the laser gas. Heating is also caused by a bright arc which alters the optical properties of the gas, causing the radiation to be diffracted and the gain of the laser to decrease markedly. The onset of bright arc discharges is governed by a number of factors. The proportions of the gas mixture in the laser will affect it. The value of the voltage source is also a factor as is the capacitance and inductance of the voltage source. The electrode gap spacing is a further factor.

With apparatus as presently constructed, current pulse lengths of the order of 1 microsecond are usable, provided however that no bright arc discharges occur.

It should also be noted that there is a delay between the application of the electric shower discharge and the radiation of coherent energy. This delay appears to be due to the effective gain of the cavity and varies from approximately $\frac{1}{2}$ to 5 microseconds. Laser operation is triggered by ambient photon "noise" and the rate of build up of the laser output pulse depends on the effective gain of the laser. While the measurement of high power laser pulses is inherently difficult, pulse length appears to have a width at half height of 100 nanoseconds and a total width of 1 or 2 microseconds.

The range of gas mixtures useable in a $CO_2$ laser is quite wide and appears to be as follows:

Helium: 0 to 99%,
Carbon Dioxide: 1 to 90%, and
Nitrogen ($N_2$): 0 to 75%

Typical voltage sources will provide an average field of 10,000 volts/cm. The apparatus has been operated with voltages of from 15 to 70 KV and electrode spacings up to 1 inch. At high voltages as low as 50% He may be used.

It has been suggested that bright arc discharges are formed when the impedance of the gas discharge is less than the source impedance.

FIG. 2 illustrates in schematic form the structure of a laser having a longitudinal electrode 22 and a plurality of point electrodes 23 energized by individual pulsers 24. The pulsers 24 are all driven by a synchronizing pulser 25 to ensure that the electrode discharges occur simultaneously.

alternatively, as illustrated in FIG. 3 a single high power pulser 26 serves to drive a plurality of electrodes with a suitable impedance in series with each discharge branch to limit current in each discharge. These impedances can be resistors as in FIG. 1 or inductors, in which case the heat dissipation losses of the network are reduced.

In the embodiment illustrated in FIG. 4 inductors are used to control the flow of current in each of the arcs and these inductors are mounted on a common core 30 and driven by a single high power pulser 31. The mutual coupling among the inductors increases the uniformity of discharge without increasing appreciably the dissipative losses.

To achieve a large volume excitation the configuration illustrated in FIG. 5 may be used. The apparatus of FIG. 5 operates in the same fashion as the apparatus of FIG. 1 and consists of a cylindrical structure 10 having a hollow central electrode 13 which may be formed from a perforated metallic tube which also acts as a gas inlet, with a plurality of peripheral electrodes 14 arranged about the outer surface of the cylindrical laser chamber 10. A curved mirror 21 is provided at one end of the laser and a plane mirror 19 provided with a cylindrical slot 20 is mounted at the other end of the lasing chamber 10 to form the optical resonator. Alignment screws 50 connect the end mirrors 19 and 21 to the cylindrical member 10 to accurately align the mirrors 19 and 21 to achieve proper laser operation.

FIG. 6 illustrates the plane mirror 19 with slot 20 formed therein. The interior surface of the mirror 19 is reflecting at the frequency of operation of the laser except for the coupling slots 20 which provide the output for the laser. The coupling apertures 20 in the plane mirror 19 may take on different shapes than the slots shown.

FIG. 7 illustrates a transverse section of the lasing chamber 10 with the central electrode 13 and the peripheral electrodes 14 arranged about the circumference of the circular chamber 10.

FIG. 8 illustrates the curved mirror 21 which is annular in shape to focus the laser energy into a cylinder.

I claim:

1. Apparatus for pumping a laser molecular gas comprising:
   an electrode system adapted to be maintained in a blanket of said laser gas at a pressure of the order of atmospheric pressure,
   said electrode system having a first electrode structure and a second electrode structure spaced from said first electrode structure,
   a pulse voltage source for producing voltage pulses of sufficient potential to initiate an electrical discharge between said first and second electrodes,
   means connecting said electrode system in series with said pulse voltage source,
   means to adjust the electron flux of said discharge to have an average electron kinetic energy approximately equal to a predetermined upper molecular vibrational energy state of said laser gas,
   wherein said first electrode structure comprises a plurality of pin electrodes, said second electrode comprises an elongated bar extending longitudinally of said pin electrodes, and said means connecting said first electrode structure in series with said voltage source comprises a resistor in series with each pin electrode,
   said voltage pulses from said pulse voltage source having a duration less than the time required to establish a bright arc discharge in said laser molecular gas.

2. In an optical resonator, a method of pumping a $CO_2$ molecular laser comprising:
   generating transverse to the optical axis of said optical resonator a pulse electron flux having an average kinetic energy not less than about 0.2 electron volts and not more than about 4.0 electron volts to excite selectively $\nu_3$ vibrations,
   maintaining a quantity of $CO_2$ gas at a pressure of the order of atmospheric pressure in said optical resonator,
   said electron flux mixing with said $CO_2$ gas to energize said $CO_2$ gas by resonant collision of molecules of $CO_2$ with said electron flux,
   said pulse electron flux having a duration less than the time required to establish a bright arc discharge in $CO_2$ at a pressure of the order of atmospheric pressure.

3. A method as defined in claim 2, and further comprising mixing with said $CO_2$ gas a minor proportion of nitrogen.

4. A method as claimed in claim 2, wherein said transverse electron flux is generated by an electric shower discharge in a gaseous mixture including a readily ionizable gas and said carbon dioxide.

5. A method as defined in claim 2, wherein said readily ionizable gas is helium.

6. Apparatus for pumping a laser molecular gas comprising:
   an optical resonator having an optical axis,
   an electrode system positioned adjacent said optical resonator, and adapted to be maintained in a blanket of said laser gas at a pressure of the order of atmospheric pressure,
   said electrode system including a first electrode structure positioned on one side of said optical axis and extending there along, and a second electrode structure spaced from said first electrode structure and positioned on the other side of said optical axis and spaced there along,
   a voltage source of sufficient potential to initiate electric shower discharge between said first and said second electrode structures to provide an electron flux having an average kinetic energy approximately equal to a predetermined upper molecular vibrational energy state of said laser gas,
   means connecting said electrode system in series with said voltage source to provide pulses of electric current to said electrodes having a duration less than the time required to establish a bright arc,
   wherein said first electrode structure comprises a plurality of pin electrodes, said second electrode comprises an elongated bar extending longitudinally of said pin electrodes, and said means connecting said first electrode structure in series with said voltage source comprises a resistor in series with each pin electrode.

7. In an optical resonator, a method of pumping a $CO_2$ molecular laser comprising:
   generating transverse to the optical axis of said optical resonator a pulse electron flux having an average kinetic energy not less than about 0.2 electron volts and not more than about 4.0 electron volt to excite selectively $\nu_3$ vibrations,
   maintaining a quantity of $CO_2$ gas at a pressure at least the order of atmospheric pressure in said optical resonator,
   said electron flux mixing with said $CO_2$ gas to energize said $CO_2$ gas by resonant collision of molecules of $CO_2$ with said electron flux,
   said pulse electron flux having a duration less than the time required to establish a bright arc discharge in said $CO_2$ gas.

8. A method as defined in claim 7, and further comprising mixing with said $CO_2$ gas a minor proportion of nitrogen and a major proportion of Helium.

9. A method as claimed in claim 7, wherein said transverse electron flux is generated by an electric shower discharge in a gaseous mixture including a readily ionizable gas and said $CO_2$ gas, said electric shower discharge being shorter than the time required to establish a bright arc.

10. A method as defined in claim 9, wherein said readily ionizable gas is Helium.

11. Apparatus for pumping a laser molecular gas comprising an optical resonator having an optical axis, an electrode system positioned adjacent said optical resonator and adapted to be maintained in a blanket of said laser gas at a pressure at least the order of atmospheric pressure, said electrode system including a first electrode structure positioned on one side of said optical axis and extending therealong, and a second electrode structure spaced from said first electrode structure and positioned on the other side of said optical axis and spaced there along, a pulse voltage source of sufficient potential to initiate an electric shower discharge between said first and said second electrode structures, the pulse length being less than that required to initiate a bright arc discharge, means connecting said electrode system in series with said voltage source and means to adjust the electron flux of said discharge to have an average electron kinetic energy approximately equal to a predetermined upper molecular vibrational energy state of said laser gas,
   wherein said first electrode structure comprises a plurality of pin electrodes, said second electrode comprises an elongated bar extending longitudinally of said pin electrodes, and said means connecting said first electrode structure in series with said voltage source comprises a resistor in series with each pin electrode.

* * * * *